United States Patent [19]

Miechowicki

[11] Patent Number: 5,195,236

[45] Date of Patent: Mar. 23, 1993

[54] WEIGHT-INSERTING MECHANISM FOR BRAKE DISC ROTOR-BALANCING MACHINE

[75] Inventor: Joseph Miechowicki, Palatine, Ill.

[73] Assignee: Illinois Tool Works Inc., Glenview, Ill.

[21] Appl. No.: 841,498

[22] Filed: Feb. 26, 1992

[51] Int. Cl.$^5$ .............................................. B23Q 7/10
[52] U.S. Cl. ........................................ 29/818; 29/894; 221/10; 221/151
[58] Field of Search ................ 29/894, 720, 809, 810, 29/818; 74/573 R; 221/10, 12, 151, 152, 163, 171, 268, 270

[56] References Cited

U.S. PATENT DOCUMENTS

| | | | |
|---|---|---|---|
| 2,980,992 | 4/1961 | Black | 29/208 |
| 3,668,773 | 6/1972 | Achterberg | 29/809 X |
| 3,805,357 | 4/1974 | Peters | 29/205 |
| 3,977,062 | 8/1976 | Wallman | 29/156 |
| 4,488,662 | 12/1984 | Fanning | 29/809 X |
| 4,735,713 | 4/1988 | Ball | 29/809 X |
| 4,861,214 | 8/1989 | Sander | 414/225 |

Primary Examiner—Timothy V. Eley
Attorney, Agent, or Firm—Dressler, Goldsmith, Shore, Sutker & Milnamow, Ltd.

[57] ABSTRACT

For machine used to balance disk brake rotors having radial walls defining tapered recesses by inserting tapered weights into selected recesses, a magazine holds a stack comprised of a controlled number of the weights and permits the weights to exit individually. Each exiting weight is oriented radially with its narrow end pointing into a selected recess. An inserter and a double-acting, pneumatic, piston-cylinder apparatus are provided for removing the lowermost weight from the magazine and inserting such weight into the selected recess. Photoelectric detectors are provided for detecting when the magazine has been depleted of a specified number of the weights, when the magazine holds the controlled number of the weights, and when the magazine has been completely depleted of the weights. The magazine has a gate for admitting the weights under certain conditions.

8 Claims, 3 Drawing Sheets

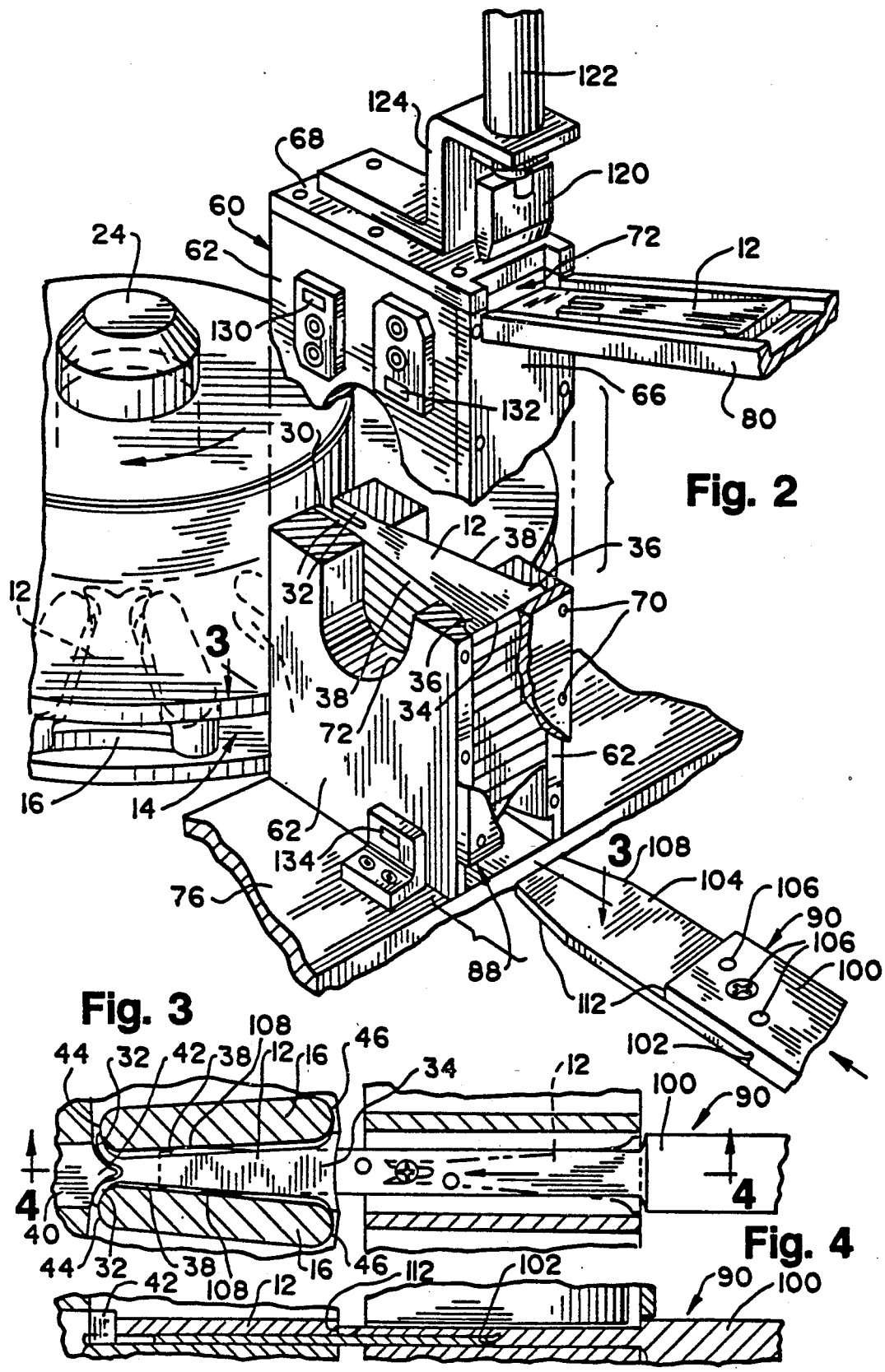

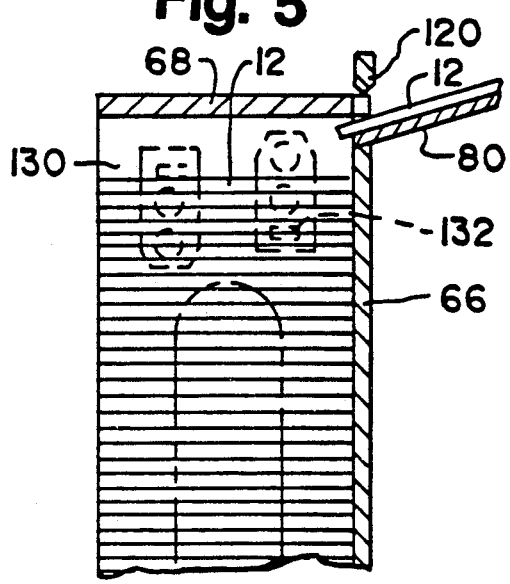
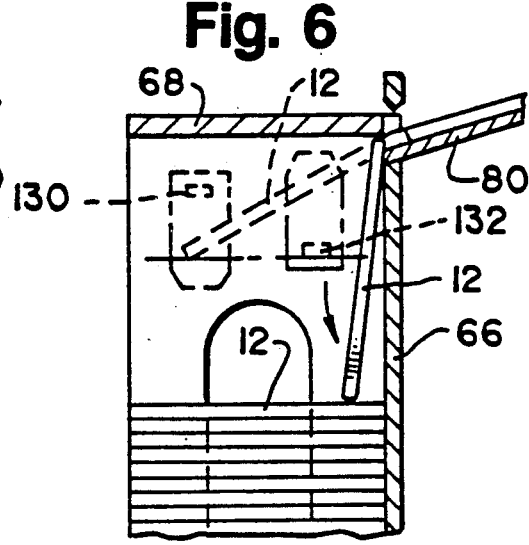
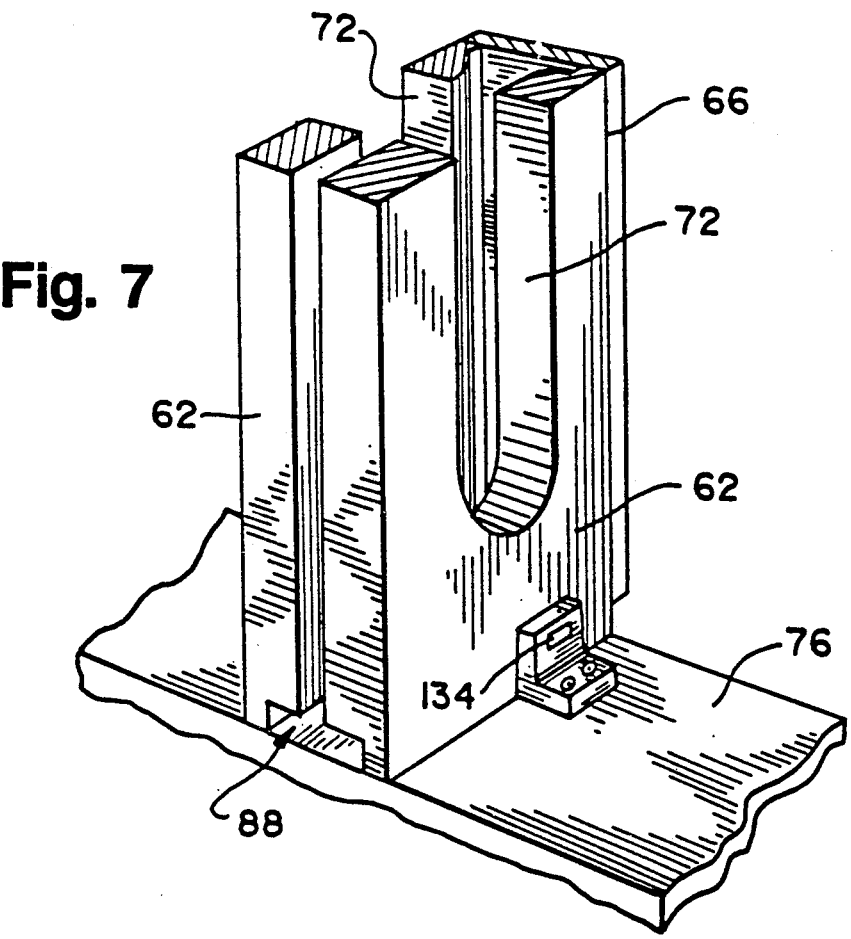

WEIGHT-INSERTING MECHANISM FOR BRAKE DISC ROTOR-BALANCING MACHINE

TECHNICAL FIELD OF THE INVENTION

This invention pertains to an improved weight-inserting mechanism for a machine used to balance brake disc rotors having radial walls defining tapered recesses by inserting tapered weights into selected recesses.

BACKGROUND OF THE INVENTION

Automated machines are used widely to balance brake disc rotors having radial walls defining tapered recesses by driving tapered weights into selected recesses. Such machines are available commercially from ITW Micro-Poise Components (a division of Illinois Tool Works Inc.) of Chicago, Ill., and Indianapolis, Ind., under its MICRO-POISE trademark. Such weights are known as hairpin weights, balance weights, and cartridge weights.

Typically, in such a machine, three stations are provided. In a testing station, a brake disc rotor is tested to determine whether it exhibits more than an acceptable amount of rotational imbalance when rotated about its axis. In a balancing station, tapered weights are inserted into selected recesses of the brake disc rotor so as to correct rotational imbalance beyond the acceptable amount. In an auditing station, the brake disc rotor is tested again for rotational imbalance.

Typically, in the balancing station, the weights are placed individually on a smooth surface and are driven by a ram into selected recesses of the brake disc rotor being balanced. Several weights may be so driven into selected recesses of one brake disk rotor. Each recess can accommodate a single weight. It is known to use a "pick and place" device employing robotic fingers to pick up each weight and to place such weight onto the smooth surface. It has proved to be very difficult to handle the weights, which tend to be easily jarred from proper alignment with the tapered recesses of the brake disc rotors. When a weight becomes misaligned, the machine can be readily jammed.

A need has arisen, to which this invention is addressed, for an improved mechanism for inserting the weights in such a brake disc rotor-balancing machine.

SUMMARY OF THE INVENTION

Responding to the aforenoted need, this invention provides an improved weight-inserting mechanism for a machine used to balance brake disc rotors having radial walls defining tapered recesses by inserting tapered weights into selected ones of those recesses. Each weight has a known shape, which includes a narrow end and a broad end and two tapered sides. There are two main aspects to this invention.

According to a first aspect of this invention, the mechanism comprises a magazine adapted to hold a stack of the weights and to permit the weights to exit the magazine individually. The magazine comprises means for guiding the weights in such manner that the individual weights exiting the magazine are oriented radially with the narrow ends pointing similarly. Moreover, the mechanism comprises means for receiving a single weight exiting the magazine and inserting the single weight with the narrow end leading the broad end into a tapered recess of a brake disc rotor being balanced in the machine.

Furthermore, the mechanism comprises means for detecting when the magazine has been depleted of a specified number of the weights, means for detecting when the magazine holds a desired number of the weights, and means for admitting the weights individually into the magazine. The admitting means is responsive to the detecting means. Thus, the admitting means admits more of the weights into the magazine when the first detecting means detects that the magazine has been depleted of the specified number of the weights. Also, the admitting means does not admit more of the weights into the magazine when the second detecting means detects that the magazine holds the desired number of the weights.

Preferably, the specified number is sufficiently small for the dimensions of the weights that, when the magazine has been depleted of the specified number of the weights, the magazine and the weights remaining in the magazine define an interior space dimensioned so that the next weight admitted into the magazine cannot tip so far as to jam the magazine.

According to a second aspect of this invention, the mechanism comprises such a magazine and means for removing a single weight exiting the magazine, inserting the single weight with the narrow end leading the broad end into a selected one of the tapered recesses of a brake disc rotor being balanced in the machine, and retaining the remaining weights in the magazine when the single weight is being inserted.

Preferably, such means comprises an inserter movable radially between a weight-receiving position and a weight-inserting position, along with means for moving the inserter radially therebetween. The inserter has a shelf configured to support the single weight as the inserter moved from the weight-receiving position into the weight-inserting position. The shelf is insertable with the single weight into the selected one of the tapered recesses and is removable therefrom after the single weight has been inserted thereinto.

Preferably, the inserter defines a step, which is configured to engage the broad end of the single weight so as to remove the single weight from the magazine when the inserter is moved from the weight-receiving toward the weight-inserting position. Preferably, the inserter defines a ledge, which is configured to engage the next weight in the magazine so as to retain the remaining weights in the magazine when the inserter is moved from the weight-receiving position.

These and other objects, features, and advantages of this invention are evident from the following description of a preferred embodiment of this invention with reference to the accompanying drawings.

BRIEF DESCRIPTION OF THE DRAWINGS

FIG. 2 is a fragmentary, perspective view of the mechanism according to this invention, as associated with a brake disc rotor being balanced in the machine shown in FIG. 1.

FIG. 3 is a fragmentary detail taken partly in cross-section to show an inserter of the mechanism shown in FIG. 2 and to show a weight being inserted into a tapered recess of a brake disc rotor. The weight is shown outside the tapered recess in phantom lines and inside the tapered recess in full lines.

FIG. 4 is a fragmentary, cross-sectional view taken along line 4—4 of FIG. 3, in a direction indicated by arrows.

FIG. 5 is a schematic, fragmentary view taken along a sectional plane and showing a weight entering the magazine, so as to reach a desired number of the weights in the magazine. Two photoelectric detectors are shown in phantom lines. The photoelectric detectors would be actually closer to the viewer than the sectional plane.

FIG. 6 is a similar view showing a weight entering the magazine under two different conditions. As shown in phantom lines, the weight is entering the magazine under a desirable condition wherein the magazine has been deleted of a selected number but not more of the weights. As shown in full lines, the weight is entering the magazine under an undesirable condition wherein the magazine has been depleted of an excessive number of the weights.

FIG. 7 is a fragmentary, perspective view of the magazine emptied completely of the weights, as viewed from a different vantage compared to FIG. 2.

DETAILED DESCRIPTION OF PREFERRED EMBODIMENT

Figure 1:
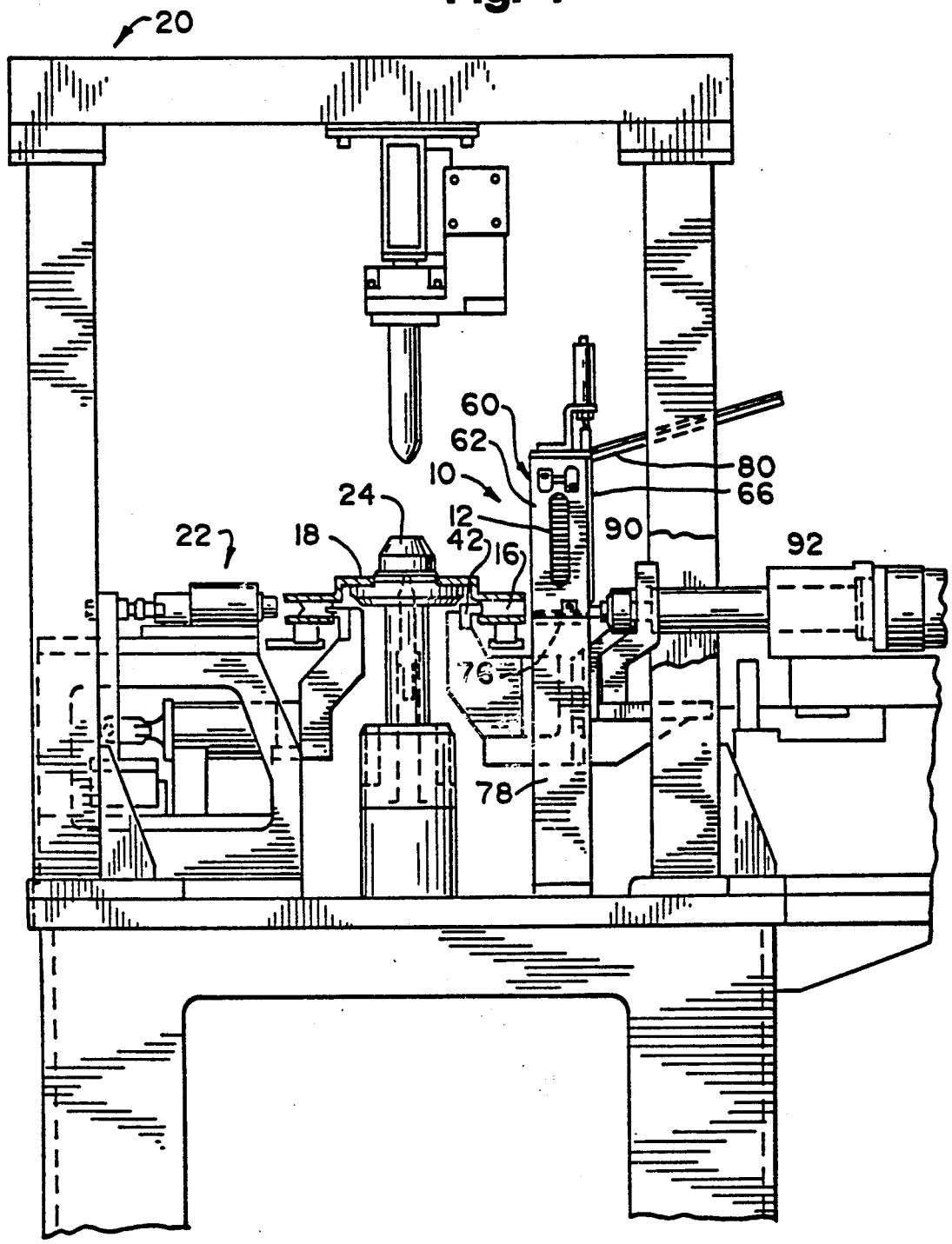
FIG. 1 is a simplified, elevational view of a machine used to balance brake disc rotors and equipped with a mechanism according to this invention.

As shown in FIG. 1, a mechanism 10 constituting a preferred embodiment of this invention is used to insert tapered weights 12 into selected ones of tapered recesses 14 (FIGS. 2, 3, and 4) defined by radial walls 16 of a brake disk rotor 18, in a balancing station of a brake disk rotor-balancing machine 20. The machine 20 comprises a known mechanism 22 for indexing the brake disk rotor 18, on arbor 24, so as to present a selected recess 14 to the mechanism 10. Except for the mechanism 10, which is novel, the machine 20 is similar to brake disk rotor-balancing machines available commercially from ITW Micro-Poise Components under its MICRO-POISE trademark. The mechanism 10 is shown apart from other elements of the machine 20 in FIGS. 2, 3, and 4, in which such a brake disk rotor 18 having such tapered recesses 14 defined by such radial walls 16 also is shown fragmentarily.

As shown in FIGS. 2, 3, and 4, each weight 12 is elongate, plate-like,—and tapered so as to have a narrow end 30 bifurcated to form two prongs 32, a broad end 34 defining two lateral tabs 36, and two tapered sides 38. The machine 20 includes a known anvil 40, which has a wedge-shaped tip 42 for spreading the prongs 32 of such a weight 12, as shown in FIG. 3, so that such prongs 32 are bent behind the inner ends 44 of the radial walls 16 defining the tapered recess 14 receiving such weight 12 when such weight 12 is driven into such recess 14 until the tabs 36 of such weight 12 are driven against the outer ends 46 of the same walls 16. Such tabs 36 may be slightly deformed when driven against the outer ends 46 of such walls 16.

According to this invention, the mechanism 10 comprises a magazine 60, which is adapted to hold a vertical stack comprised of a desirable number (e.g. thirty-six) of the tapered weights 12. The magazine 60 has two lateral walls 62 with tapered interior surfaces 64 conforming to the tapered weights 12, an end wall 66 joining a lateral wall 62 and covering broad ends 34 of the stacked weights 12, and a top wall 68. The walls 62, 66, 68, are assembled by screw fasteners 70. The lateral walls 62 have vertically elongate openings 72 permitting visual inspection of some of the stacked weights 12 in the magazine 60. The magazine 60 is mounted on a horizontal table 76, which is supported by two upright members 78 (one shown in FIG. 1) in the machine 20.

As shown in FIG. 2, where the end wall 66 and the top wall 68 meet, the magazine 60 has a wide slot 72, through the tapered weights 12 are admitted individually into the magazine 60 with the narrow ends 30 leading the broad ends 34. A chute 80 reading from a vibratory feeder (not shown) of a known type is mounted to the end wall 64 so as to incline downwardly toward the wide slot 72. The chute 80 is used to guide the tapered weights 12 individually from the vibratory feeder into the magazine 60 via the wide slot 72.

The lateral walls 62 of the magazine 60 guide the stacked weights 12 in such manner that each individual weight 12 exiting the magazine 60 is oriented radially with the narrow end 30 pointing similarly. The indexing mechanism 22 is operable in a known manner to index the brake disk rotor 18, as indicated by a curved arrow in FIG. 2, until a selected recess 14 is presented to the mechanism 10. Thus, the lowermost weight 12 in the magazine 60 is oriented radially with the narrow end 30 pointing into the selected recess 14.

The lateral wall 62 and the end wall 66 define a lower groove 88, along which the lowermost weight 12 can be lengthwise driven into the selected recess 14 of the brake disk rotor 18. The mechanism 10 comprises an inserter 90, which is driven by a double-acting, pneumatic, piston-cylinder apparatus 92 (FIG. 1) for driving such weight 12 into such recess 14. The inserter 90 is movable radially, along the groove 88, between a weight-receiving position and a weight-inserting position. The piston-cylinder apparatus 92 is arranged to move the inserter 90 radially between the weight-receiving position and the weight-inserting position. The inserter 90 has an elongate, proximal member 100 provided with a lower recess 102 anc an elongate, distal member 104 extended from the lower recess 102 and mounted to the proximal member 100 by screw fasteners 106. The distal member 104 has two tapered edges 108 conforming to the radial walls 16 defining the tapered recesses 14 of the brake disk rotor 18. In FIG. 2, the magazine 60 and the inserter 90 are shown in an exploded condition, for illustrative purposes. Actually, as it is moved between the weight-receiving position and the weight-inserting position, the distal member 104 is not withdrawn fully from the groove 88.

The distal member 104 defines a shelf 110 configured to receive the lowermost weight 12 in the magazine 60 in the weight-receiving position of the inserter 60 and to support such weight 12 as the inserter 90 is moved from the weight-receiving position into the weight-inserting position. Because of the tapered edges 108 of the distal member 104, the distal member 104 defining the shelf 110 is insertable with such weight 12 into the selected recess 14 and is removable from the selected recess 14 after such weight 12 has been inserted thereinto. The proximal member 100 and the distal member 104 define a step 112, which is configured to engage the broad end 34 of such weight 12 so as to remove such weight 12 from the magazine 60 when the inserter 90 is moved from the weight-receiving position toward the weight-inserting position. The proximal member 100 defines a ledge 114, which is configured to engage the next weight 12 in the magazine 60 so as to retain the remaining weights 12 in the magazine 60 when the inserter 90 is moved from the weight-receiving position.

A gate 120 is mounted on the top wall 68 of the magazine 60 so as to be vertically movable. The gate 120, which is operated by a double-acting, pneumatic, piston-cylinder apparatus 122, is arranged to open the wide slot 74 of the magazine 60 when it is desired to admit more of the tapered weights 12 into the magazine 60 and to close the wide slot 74 when it is desired to prevent more of the tapered weights 12 from entering the magazine 60. The gate 120 and the piston-cylinder apparatus 122 are supported operatively by a bracket 124 mounted on the top wall 68.

As shown in FIG. 2, three photoelectric detectors of a known type are mounted operatively to one of the lateral walls 62 of the magazine 60. Each photoelectric detector is arranged to transmit a photoelectric beam from a photoelectric transmitter (not shown) within the magazine 60 to a photoelectric receiver (not shown) within the magazine 60 so as to detect when one of the weights interrupts such beam.

A first such detector 130 is arranged to detect when the weights 12 holds a desired number of the weights. A second such detector 132 is arranged to detect when the magazine 60 has been depleted of a specified number of such weights 12. A third such detector 134 is arranged to detect when the magazine 60 has been completely depleted of the weights 12. The first detector 130 and the second detector 132 are arranged to control the piston-cylinder apparatus 122, which controls the gate 120, so as to admit more of the weights 12 when the first detector 130 detects that the magazine 60 has been depleted of the specified number of the weights 12 and so as not to admit more of the weights 12 into the magazine 60 when the second detector 132 detects that the magazine 60 holds the desired number of the weights 12. Preferably, the specified number is five and the desired number is a much greater number, e.g thirty-six. The third detector 134 is arranged to disable the mechanism 10 when such detector 134 detects that the magazine 60 has been completely depleted of the weights 12.

In FIG. 5, the gate 130 is shown as moved upwardly to admit a weight 12 into the magazine 60, so as to bring the total number of the weights 12 in the magazine to the desired number. When the first detector 130 detects that the magazine 60 holds the desired number of the weights 12, the gate 120 is moved downwardly to prevent more of the weights 12 from entering the magazine 60.

In FIG. 6, the gate 130 is shown as moved upwardly to admit a weight 12 into the magazine 60, under two different conditions. As shown in phantom lines, a desirable condition exists wherein the magazine 60 has been depleted by the specified number of the weights 12. The specified number, which preferably is five, is sufficiently small for the dimensions of the weights 12 that, when the magazine 60 has been depleted of the specified number of the weights 12, the magazine 60 and the weights 12 remaining in the magazine 60 define an interior space dimensioned so that the weight 12 being admitted into the magazine 60 cannot tip so far as to jam the magazine 60. As shown in full lines, an undesirable condition exists wherein the magazine has been depleted by a greater number of the weights 12, so as to permit the weight 12 entering the magazine 60 to tip so far as to jam the magazine 60. The first detector 130 and the second detector 132 control the gate 130, via the piston-cylinder apparatus 132, so as to prevent the undesirable condition from occurring so long as there is an uninterrupted supply of the weights 12 being fed along the chute 80.

Various modifications may be made in the preferred embodiment described above without departing from the scope and spirit of this invention.

I claim:

1. For a machine used to balance brake disk rotors having radial walls defining tapered recesses of uniform dimensions by inserting tapered weights of uniform dimensions into selected ones of said recesses, each weight having a narrow end and a broad end and two tapered sides, a mechanism comprising
    (a) a magazine adapted to hold a stack of a controlled number of the weights and to permit the weights to exit the magazine individually, the magazine comprising means for guiding the weights in such manner that each individual weight exiting the magazine is oriented radially with the narrow end pointing in the same direction,
    (b) means for removing a single weight exiting the magazine and inserting the single weight with the narrow end leading the broad end into a tapered recess of a brake disk rotor being balanced in the machine, and
    (c) first detecting means for detecting when the magazine has been depleted of a specified number of the weights, second detecting means for detecting when the magazine holds the controlled number of the weights, and means for admitting the weights individually into the magazine, wherein the admitting means is responsive to the first and second detecting means so as to admit more of the weights into the magazine when the first detecting means detects that the magazine has been depleted of the specified number of the weights and so as to prevent more of the weights from being admitted into the magazine when the second detector detects that the magazine holds the controlled number of the weights.

2. The mechanism of claim 1 combined with tapered weights of uniform dimension wherein the specified number is sufficiently small for the dimensions of the weights that, when the magazine has been depleted of the specified number of the weights, the magazine and the weights remaining in the magazine define an interior space dimensioned so that the next weight admitted into the magazine cannot tip so far as to jam the magazine.

3. The mechanism of claim 1 combined with tapered weights of uniform dimension, each weight having tapered sides, wherein the magazine has tapered walls conforming to the tapered sides of the weights.

4. For a machine used to balance brake disk rotors having radial walls defining tapered recessed by inserting tapered weights into selected ones of said recesses, each weight having a narrow end and a broad end and two tapered sides, a mechanism comprising
    (a) a magazine adapted to hold a stack of the weights and to permit the weights from the stack to exit the magazine individually, the magazine comprising means for guiding the weights in the magazine in such manner that each weight exiting the magazine is oriented radially with the narrow end pointing in the same direction,
    (b) means for receiving a single weight exiting the magazine, for inserting the single weight with the narrow end leading the broad end into a selected one of the tapered recesses of brake disk rotor being balanced in the machine, and for retaining the remaining weights in the magazine when the single weight is being inserted.

5. The mechanism of claim 4 wherein said means comprises an inserter movable radially between a weight-receiving position and a weight-inserting position and means for moving the inserter radially therebetween, the inserter having a shelf configured to support the single weight as the inserter is moved from the weight-receiving position into the weight-inserting position, the shelf being insertable with the single weight into the selected one of the tapered recesses and being removable therefrom after the single weight has been inserted thereinto.

6. The mechanism of claim 5 wherein the inserter defines a step configured to engage the broad end of the single weight so as to move the single weight from the magazine when the inserter is moved from the weight-receiving position toward the weight-inserting position.

7. The mechanism of claim 5 wherein the inserter defines a ledge configured to engage the next weight in the magazine so as to retain the remaining weight-receiving position.

8. The mechanism of claim 5 wherein the inserter defines a step configured to engage the broad end of the single weight so as to remove the single weight from the magazine when the inserter is moved from the weight-receiving position and a ledge configured to engage the next weight in the stack so as to retain the remaining weights in the magazine when the inserter is moved from the weight-receiving position.

* * * * *